United States Patent
Zhu et al.

(10) Patent No.: US 11,517,035 B2
(45) Date of Patent: Dec. 6, 2022

(54) DRAWER ASSEMBLY AND REFRIGERATING AND FREEZING DEVICE WITH DRAWER ASSEMBLY

(71) Applicant: QINGDAO HAIER JOINT STOCK CO., LTD., Qingdao (CN)

(72) Inventors: Xiaobing Zhu, Qingdao (CN); Bo Jiang, Qingdao (CN); Lei Wang, Qingdao (CN); Hao Zhang, Qingdao (CN); Jing Wang, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 813 days.

(21) Appl. No.: 16/466,196

(22) PCT Filed: Dec. 1, 2017

(86) PCT No.: PCT/CN2017/114202
§ 371 (c)(1),
(2) Date: Jun. 3, 2019

(87) PCT Pub. No.: WO2018/099455
PCT Pub. Date: Jun. 7, 2018

(65) Prior Publication Data
US 2020/0068924 A1 Mar. 5, 2020

(30) Foreign Application Priority Data
Dec. 2, 2016 (CN) .......................... 201611097067.7

(51) Int. Cl.
*F25D 25/02* (2006.01)
*A23L 3/3418* (2006.01)
(Continued)

(52) U.S. Cl.
CPC .......... *A23L 3/3418* (2013.01); *F25D 17/042* (2013.01); *F25D 17/062* (2013.01);
(Continued)

(58) Field of Classification Search
CPC .... F25D 17/042; F25D 17/062; F25D 25/025; F25D 2317/041; F25D 2317/061; F25D 2317/0683; A23L 3/3418; A23V 2002/00
See application file for complete search history.

(56) References Cited

U.S. PATENT DOCUMENTS

| 6,090,422 A | * | 7/2000 | Taragan ................ F25D 17/042 |
| | | | 62/169 |
| 2007/0163290 A1 | * | 7/2007 | Shin ....................... F25D 17/065 |
| | | | 62/186 |

(Continued)

FOREIGN PATENT DOCUMENTS

| CN | 201199115 Y | 2/2009 |
| CN | 101544356 A | 9/2009 |

(Continued)

*Primary Examiner* — David J Teitelbaum
(74) *Attorney, Agent, or Firm* — Cheng-Ju Chiang

(57) ABSTRACT

The present invention relates to a drawer assembly and a refrigerating and freezing device with the drawer assembly. The drawer assembly comprises a cartridge defined a drawing space and a modified atmosphere film assembly, an accommodating cavity is defined in a top wall of the cartridge, the accommodating cavity is communicated with the drawer space; the modified atmosphere film assembly is mounted in the accommodating cavity, and the modified atmosphere film assembly is provided with a modified atmosphere film and an oxygen-enriched gas collecting cavity, so that when the pressure of the oxygen-enriched gas collecting cavity is less than the pressure of the accommodating cavity, oxygen in air of the accommodating cavity penetrates the modified atmosphere film to the oxygen-enriched gas collecting cavity, so as to obtain a gas atmosphere with rich nitrogen and lean oxygen, facilitating for fresh keeping of foods.

9 Claims, 4 Drawing Sheets

(51) Int. Cl.
*F25D 17/04* (2006.01)
*F25D 17/06* (2006.01)
(52) U.S. Cl.
CPC ........ *F25D 25/025* (2013.01); *A23V 2002/00* (2013.01); *F25D 2317/041* (2013.01); *F25D 2317/061* (2013.01); *F25D 2317/0683* (2013.01)

(56) References Cited

U.S. PATENT DOCUMENTS

| | | | | |
|---|---|---|---|---|
| 2008/0196440 | A1* | 8/2008 | Kang | F25D 17/065 62/407 |
| 2015/0184918 | A1* | 7/2015 | Klingshirn | F25D 17/08 62/414 |
| 2016/0006091 | A1* | 1/2016 | Schweinbenz | H01M 12/08 429/405 |

FOREIGN PATENT DOCUMENTS

| | | | |
|---|---|---|---|
| CN | 101766321 | A | 7/2010 |
| CN | 204757524 | U | 11/2015 |
| CN | 106766622 | A | 5/2017 |
| CN | 206291612 | U | 6/2017 |
| JP | H5-227881 | A | 9/1993 |
| JP | 2004-360948 | A | 12/2004 |

* cited by examiner

DRAWER ASSEMBLY AND REFRIGERATING AND FREEZING DEVICE WITH DRAWER ASSEMBLY

CROSS-REFERENCE TO RELATED APPLICATION

The present application is a 35 U.S.C. §371 National Phase conversion of International (PCT) Patent Application No. PCT/CN2017/114202, filed on Dec. 1, 2017, which claims the priority to the Chinese Patent Application No. 201611097067.7, filed on Dec. 2, 2016 and entitled "Drawer Assembly and Refrigerating and Freezing Device with Drawer Assembly", which is incorporated herein by reference in its entirety. The PCT International Patent Application was filed and published in Chinese.

TECHNICAL FIELD

The present invention relates to the technical field of item storage by refrigerators, and in particular to a drawer assembly and a refrigerating and freezing device with the drawer assembly.

BACKGROUND

The refrigerator is a kind of refrigeration equipment for keeping a constant low temperature, and is also a civilian product that keeps foods or other items at a constant low-temperature cold state. With the improvement in the life quality, the consumers' demand on freshness-keeping of the stored foods is also growing, especially the demand on the color, taste and the like of the foods. Thus, the stored foods shall be guaranteed to keep their color, taste, freshness and the like as unchanged as possible during the storage. At present, only the vacuum freshness-keeping is available on the market for better storing the foods, and freshness-keeping with a vacuum bag and freshness-keeping with a vacuum drawer are two customary vacuum freshness-keeping manners.

Regarding freshness-keeping with the vacuum bag, the consumers need to carry out vacuuming every time they store food, and thus, the bag is not enjoyed by the consumers due to the troublesome operation.

Regarding freshness-keeping with the vacuum drawer, the requirements on the vacuuming system and the sealing performance of a drawer or a cartridge are very high to keep a vacuum state since the drawer, the cartridge or the like is of a rigid structure. Each time an item is put or taken, a large quantity of new air rushes in, causing the energy consumption to be rather high. In addition, under a vacuum environment, it is relatively difficult for the foods to receive cold, which is particularly unfavorable for the storage of foods. Furthermore, it takes a lot of effort for the user to open the drawer every time under the vacuum environment, which makes it inconvenient for the user to use. Although the drawer compartment of some refrigerators can be ventilated through the vacuuming system, the user may need to wait for a long time, resulting in poor timeliness. In addition, the long vacuum time may also cause serious deformation of the drawer assembly of the refrigerator. That is, the existing drawer assembly with a vacuuming structure cannot well complete the vacuum freshness-keeping, and its requirements on strength of the drawer are rather high, which thereby has a high implementation requirement and a high cost.

SUMMARY

One object of a first aspect of the present invention is to overcome at least one deficiency of the existing drawer assembly by providing a novel drawer assembly, which creatively proposes to discharge oxygen from air of a drawer space to obtain in this space a gas atmosphere that is rich in nitrogen but poor in oxygen to facilitate freshness-keeping of the foods. A modified atmosphere film assembly is provided at a specific position, such that the drawer space is not occupied additionally and the drawer and the foods within the drawer are also prevented from damaging the modified atmosphere film assembly.

A further object of the first aspect of the present invention is to increase fluidity of the airflow in the drawer space, so that the oxygen can be discharged from the drawer space as much as possible.

According to the first aspect of the present invention, the present invention provides a drawer assembly for a refrigerating and freezing device. The drawer assembly comprises: a cartridge, having a drawer space defined therein and an accommodating cavity defined in a top wall thereof, wherein the accommodating cavity is communicated with the drawer space;

a drawer, slidably mounted in the cartridge to be operatively withdrawn from and inserted into the cartridge from a forward opening of the cartridge; and an modified atmosphere film assembly, mounted in the accommodating cavity and having a modified atmosphere film and an oxygen-rich gas collecting chamber, wherein the modified atmosphere film has its one side facing the oxygen-rich gas collecting chamber and the other side facing the accommodating cavity, such that when the pressure of the oxygen-rich gas collecting chamber is lower than that of the accommodating cavity, oxygen in the air of the accommodating cavity is transmitted into the oxygen-rich gas collecting chamber through the modified atmosphere film, thereby discharging a part of or all of the oxygen from the air of the drawer space to obtain in the drawer space a gas atmosphere that is rich in nitrogen but poor in oxygen to facilitate freshness-keeping of the foods.

Optionally, at least one first communication hole and at least one second communication hole are defined on an inner side surface of the top wall of the cartridge; and the drawer space is communicated with the accommodating cavity through the at least one first communication hole and the at least one second communication hole.

The drawer assembly further comprises a fan configured to drive gas in the drawer space to the accommodating cavity through the at least one first communication hole, and drive gas in the accommodating cavity to the drawer space through the at least one second communication hole.

Optionally, the fan is a centrifugal fan that is provided in the accommodating cavity and located above the at least one first communication hole.

Optionally, the modified atmosphere film assembly is provided above the at least one second communication hole.

Optionally, the at least one first communication hole is provided at a front portion of the top wall, and the at least one second communication hole is provided at a rear portion of the top wall.

Optionally, the top wall comprises a lower plate portion and a cover plate portion, wherein an upper surface of the lower plate portion forms a recessed groove, and the cover plate portion is provided to cover the recessed groove to form the accommodating cavity.

Optionally, two sets of air guiding rib plates, which are symmetrically provided, are extended downwardly from the inner surface of the cover plate portion, and each set of the air guiding rib plates comprises:

a first air guiding rib plate, extending toward one side of the accommodating cavity from an air outlet of the centrifugal fan to a laterally outer side of the modified atmosphere film assembly;

at least one second air guiding rib plate, provided at an inner side of the first air guiding rib plate and located between the modified atmosphere film assembly and the centrifugal fan; and at least one third air guiding rib plate, provided at the laterally outer side of the modified atmosphere film assembly.

Optionally, the modified atmosphere film assembly further comprises a support frame, and the support frame has a first surface and a second surface that are provided oppositely and forms therein at least one airflow passage communicated with the first surface and the second surface.

The number of the modified atmosphere films is two, and the two modified atmosphere films are respectively provided on the first surface and the second surface of the support frame to form the oxygen-rich gas collecting chamber together with the at least one airflow passage of the support frame.

According to a second aspect of the present invention, the present invention provides a refrigerating and freezing device that comprises any one of the aforesaid drawer assembly and a suction device; the suction device is communicated with the oxygen-rich gas collecting chamber of the modified atmosphere film assembly of the drawer assembly through a pipeline, such that pressure of the oxygen-rich gas collecting chamber is lower than that of the accommodating cavity of the drawer assembly.

Optionally, the refrigerating and freezing device further comprises:

a cabinet, defining therein a storage space in which the cartridge of the drawer assembly is provided; and a door body, configured to open or close the storage space.

Due to the modified atmosphere film assembly formed therein, the drawer assembly and the refrigerating and freezing device of the present invention may form in the drawer space the gas atmosphere that is rich in nitrogen but poor in oxygen to facilitate freshness-keeping of the foods; and the gas atmosphere, by reducing the content of oxygen in a fruit and vegetable storage space, reduces the aerobic respiration intensity of the fruit and vegetable, and meanwhile ensures the basic respiration effect, and thus prevents the anaerobic respiration of the fruit and vegetable, thereby achieving the object in keeping freshness of the fruit and vegetable for a long term.

Furthermore, since the modified atmosphere film assembly of the drawer assembly of the present invention is provided at the specific position, the space of the drawer assembly can be fully utilized without the need to occupy the storage space, and the modified atmosphere film assembly can be protected by preventing the drawer and the foods within the drawer from moving and damaging the modified atmosphere film assembly.

Furthermore, the drawer assembly of the present invention has the fan therein for enhancing fluidity of the airflow in the drawer space to discharge oxygen from the drawer space as much as possible. The cold in the drawer space can also be distributed evenly to facilitate storage or cooling of the food.

Furthermore, the drawer assembly of the present invention not only has a good freshness-keeping effect, but also has a relatively lower requirement on rigidity and strength of the drawer, the cartridge and the like, which thereby has a low implementation requirement and a low cost.

DETAILED DESCRIPTION

Figure 1:
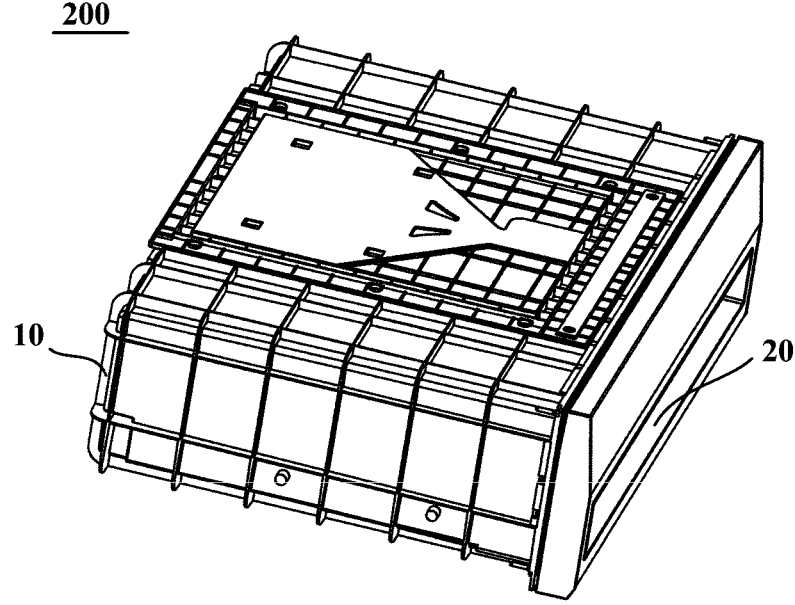
FIG. 1 is a schematic structural diagram of a drawer assembly according to one embodiment of the present invention.

The present invention will be described hereinafter in detail with reference to specific embodiments shown in the drawings. However, these embodiments do not limit the present invention, and the structures, methods, or functional changes made by those skilled in the art according to these embodiments are all included in the protection scope of the present invention.

Figure 2:
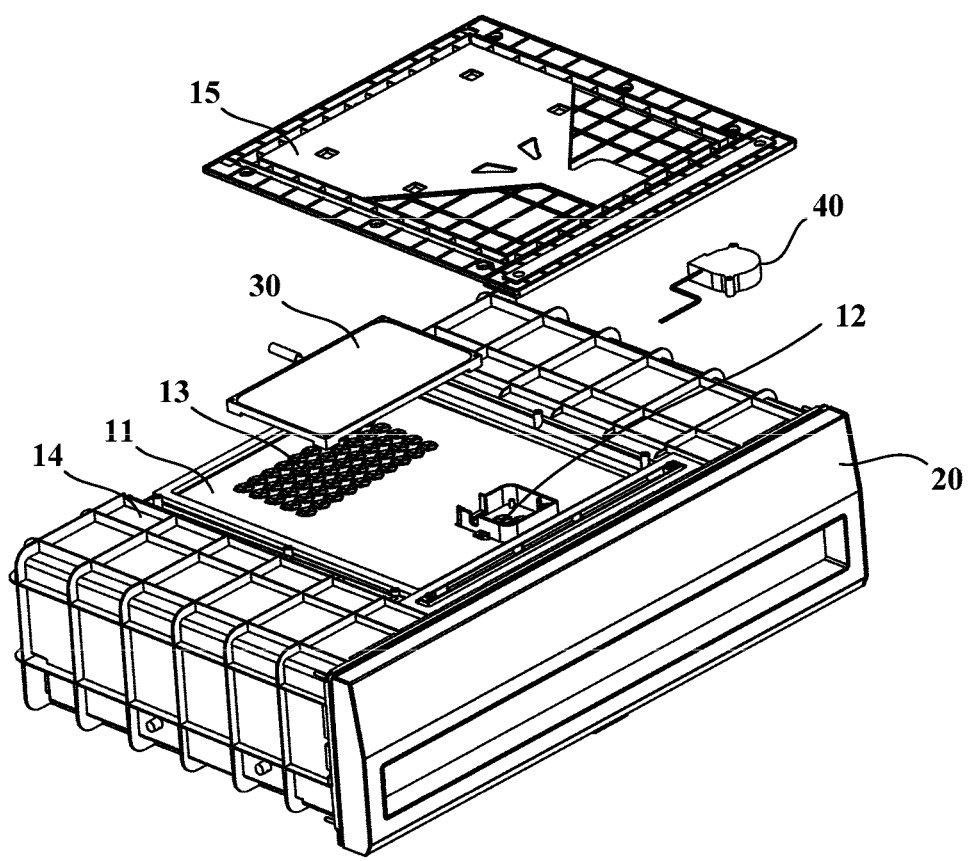
FIG. 2 is a schematic exploded view of a drawer assembly according to one embodiment of the present invention.

FIG. 1 is a schematic structural diagram of a drawer assembly 200 according to one embodiment of the present invention; and FIG. 2 is a schematic exploded view of the drawer assembly 200 according to one embodiment of the present invention. As shown in FIGS. 1 and 2, the present invention provides a drawer assembly 200 for a refrigerating and freezing device, which may comprise a cartridge 10, a drawer 20 and a modified atmosphere film assembly 30. The cartridge 10 defines a drawer space therein, the top wall of the cartridge 10 defines an accommodating cavity 11 therein, and the accommodating cavity 11 is communicated with the drawer space. The drawer 20 may be slidably mounted in the cartridge 10 to be operatively withdrawn from and inserted into the cartridge 10 from a forward opening of the cartridge 10. The drawer 20 may have a drawer end cover that can cooperate with the opening of the cartridge 10 to open and seal the drawer space. The modified atmosphere film assembly 30 is mounted in the accommodating cavity 11 and has a modified atmosphere film and an oxygen-rich gas collecting chamber. The modified atmosphere film has its one side facing the oxygen-rich gas collecting chamber and the other side facing the accommodating cavity 11, such that when the pressure of the oxygen-rich gas collecting chamber is lower than that of the accommodating cavity 11, oxygen in the air of the accommodating cavity 11 is transmitted into the oxygen-rich gas collecting chamber through the modified atmosphere film, thereby discharging a part of or all of the oxygen from the air of the drawer space to obtain in the drawer space a gas atmosphere that is rich in nitrogen but poor in oxygen to facilitate freshness-keeping of the foods.

When the drawer assembly 200 of the present invention is in use, a suction device 400 may be communicated with the oxygen-rich gas collecting chamber to draw the air from the drawer space, so that the pressure of the oxygen-rich gas collecting chamber is lower than that of the accommodating cavity 11 and thus a gas atmosphere that is rich in nitrogen but poor in oxygen to facilitate freshness-keeping of the foods may be formed in the drawer space. The gas atmosphere, by reducing the content of oxygen in a fruit and vegetable storage space, reduces the aerobic respiration intensity of the fruit and vegetable, and meanwhile ensures the basic respiration effect, and thus prevents the anaerobic respiration of the fruit and vegetable, thereby achieving the object in keeping freshness of the fruit and vegetable for a long term. Moreover, the gas atmosphere also has a large amount of gases such as nitrogen, which does not reduce the refrigeration efficiency of items in the drawer space, and thus effectively stores the fruit and vegetable.

In some embodiments of the present invention, at least one first communication hole 12 and at least one second communication hole 13 are defined in an inner side surface of the top wall of the cartridge 10. The drawer space is communicated with the accommodating cavity 11 through the at least one first communication hole 12 and the at least one second communication hole 13. The drawer assembly 200 further comprises a fan 40 configured to drive the gas in the drawer space into the accommodating cavity through the at least one first communication hole 12, and drive the gas in the accommodating cavity 11 into the drawer space through the at least one second communication hole 13.

The fan 40 is preferably a centrifugal fan that is provided in the accommodating cavity 11 and located above the at least one first communication hole 12. The air inlet of the centrifugal fan faces the at least one first communication hole 12. The modified atmosphere film assembly 30 is provided above the at least one second communication hole 13. The air outlet of the centrifugal fan may face the modified atmosphere film assembly 30. The at least one first communication hole 12 is provided at a front portion of the top wall, and the at least one second communication hole 13 is provided at a rear portion of the top wall. That is, the centrifugal fan 40 may be provided at the front portion of the accommodating cavity 11. The modified atmosphere film assembly 30 may be provided at the middle and rear portions of the accommodating cavity 11.

In order to facilitate the manufacture of the cartridge 10, the top wall may comprise a lower plate portion 14 and a cover plate portion 15. The upper surface of the lower plate portion 14 forms a recessed groove, and the cover plate portion 15 is provided to cover the recessed groove to form the accommodating cavity 11. The lower plate portion 14 of the top wall may be integrally formed with the side wall, the rear wall and the bottom wall of the cartridge 10.

Figure 3:
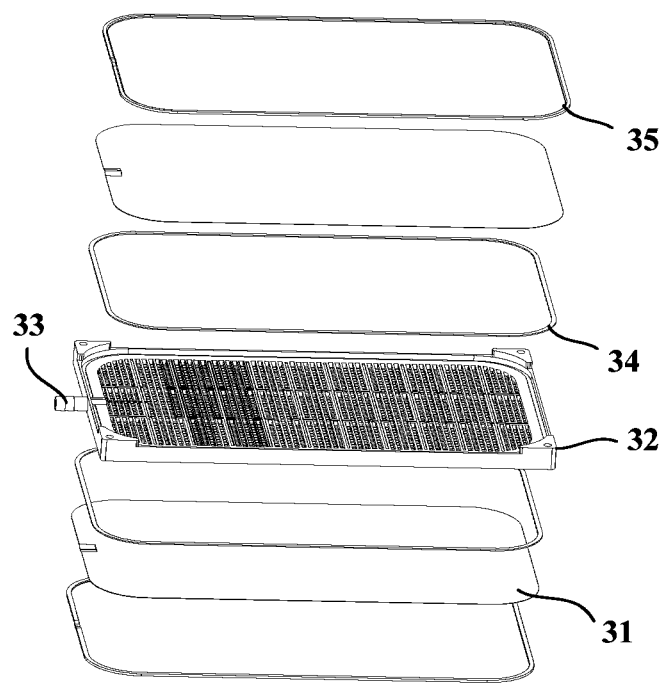
FIG. 3 is a schematic exploded view of a modified atmosphere film assembly in the drawer assembly shown in FIG. 1.

In some embodiments of the present invention, as shown in FIG. 3, the modified atmosphere film assembly 30 may be of a flat plate shape, and may further comprise a support frame 32. The modified atmosphere film 31 is preferably an oxygen-rich membrane. The number of the modified atmosphere films may be two, and the two modified atmosphere films are mounted on two sides of the support frame 32 respectively, so that the two modified atmosphere films 31 form the oxygen-rich gas collecting chamber together with the support frame 32.

Furthermore, the support frame 32 may comprise a frame, and structures, such as, a rib plate and/or a flat plate, provided in the frame. An airflow passage may be formed between the rib plates or between the rib plates and the flat plate; and a groove may be defined on a surface of each of the rib plate and the flat plate to form the airflow passage. The rib plate and/or the flat plate may enhance the structural strength and the like of the modified atmosphere film assembly 30. That is, the support frame 32 has a first surface and a second surface that are provided oppositely, and forms therein at least one airflow passage communicated with the first surface and the second surface. The two modified atmosphere films 31 are respectively provided on the first surface and the second surface of the support frame 32 to form the oxygen-rich gas collecting chamber together with the at least one airflow passage of the support frame 32.

In some embodiments of the present invention, the support frame 32 comprises a suction hole 33 communicated with the at least one airflow passage and is provided on the frame to allow output of the oxygen in the oxygen-rich gas collecting chamber. The suction hole 33 is communicated with a suction pump 41. The modified atmosphere film 31 is firstly mounted on the frame by a double-sided tape 34, and then sealed by a sealant 35.

In some embodiments, the aforesaid at least one airflow passage formed inside the support frame 32 may be one or more cavities communicated with the suction hole 33. In some embodiments, the aforesaid at least one airflow passage formed inside the support frame 32 may be of a grid structure. In particular, the support frame 32 may comprise a frame, a plurality of first rib plates, and a plurality of second rib plates. The plurality of first rib plates are provided in the frame by being spaced apart from each other in the longitudinal direction and extend in the lateral direction, and one side surface of the plurality of first ribs forms the first surface. The plurality of second rib plates are provided on the other side surface of the plurality of first rib plates by being spaced apart from each other in the lateral direction and extending in the longitudinal direction, and one side surface of the plurality of second rib plates away from the first rib plates forms the second surface. The support frame 32 of the present invention is provided with the plurality of first rib plates that are provided in the frame by being spaced apart from each other in the longitudinal direction and extending in the lateral direction and the plurality of second rib plates that are provided on the other side surface of the plurality of first rib plates by being spaced apart from each other in the lateral direction and extending in the longitudinal direction. In this way, the continuity of the airflow passage can be ensured on the one hand, on the other hand the volume of the support frame 32 can be greatly reduced, and the strength of the support frame 32 is enhanced greatly. Furthermore, the above structure of the support frame 32 ensures sufficient support for the modified atmosphere film 31, so that the better flatness can be maintained at all times even if the negative pressure in the oxygen-rich gas collecting chamber is relatively larger, thereby ensuring the service life of the modified atmosphere film assembly 31.

In a further embodiment, the plurality of first rib plates may comprise a plurality of first narrow rib plates and a plurality of first wide rib plates. The plurality of first wide rib plates are spaced apart from each other, and the plurality of first narrow rib plates are provided between two adjacent first wide rib plates. The plurality of second rib plates may comprise a plurality of second narrow rib plates and a plurality of second wide rib plates. The plurality of second wide rib plates are spaced apart from each other, and the plurality of the second narrow rib plates are provided between two adjacent second wide ribs. A person skilled in the art may easily understand that the words "wide" and "narrow" herein are relative.

In some embodiments, each of the first wide rib plates is recessed inwardly from the side surface, which forms the first surface, to form a first trench, and each of the second wide rib plates is recessed inwardly from the side surface, which forms the second surface, to form a second trench, so as to improve the communication of the internal grid structure of the support frame on the premise that the thickness (or volume) of the support frame 32 is very small.

In a further embodiment, a partial surface of each of the first wide rib plates facing away from the first surface extends toward the second rib plates to be flush with the second surface, and each of the first wide rib plates is recessed inwardly from the partial surface that is flush with the second surface to form a third trench; and the third trench and the second trench are communicated at an intersection therebetween to form a cross-shaped trench. A partial surface of at least one of the plurality of second wide rib plates away from the second surface extends toward the first rib plates to be flush with the first surface, and the at least one second wide rib plate is recessed inwardly from the partial surface that is flush with the first surface to form a fourth trench; and the fourth trench and the first trench are communicated at an intersection therebetween to form a cross-shaped trench.

In some embodiments of the present invention, the distance between the modified atmosphere film 31 on the upper side of the modified atmosphere film assembly 30 and the top surface of the accommodating cavity 11 is 8 mm to 20 mm. The distance between the modified atmosphere film 31 on the lower side of the modified atmosphere film assembly 30 and the bottom surface of the accommodating cavity 11 is 8 mm to 20 mm.

Figure 4:
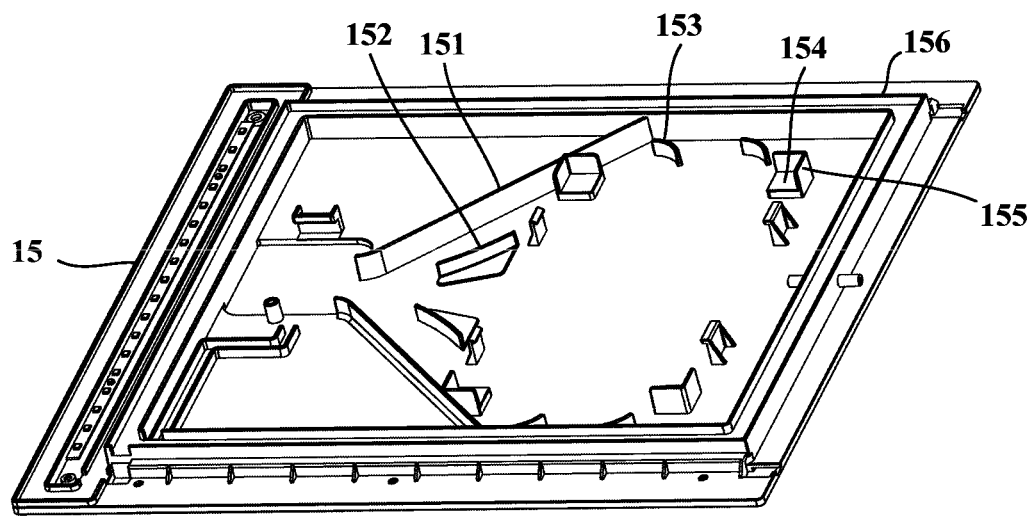
FIG. 4 is a schematic structural diagram of a cover plate portion in a drawer assembly according to one embodiment of the present invention.

In some embodiments of the present invention, in order to facilitate flow of the airflow, a plurality of air guiding rib plates, as shown in FIG. 4, may be extended downwardly from the inner surface of the cover plate portion 15. The plurality of air guiding rib plates may be divided into two sets, that is, a first set of air guiding rib plates and a second set of air guiding rib plates that is arranged symmetrically with the first set of air guiding rib plates about a plane. Each set of the air guiding rib plates comprises a first air guiding rib plate 151, at least one second air guiding rib plate 152, and at least one third air guiding rib plate 153. The first air guiding rib plate 151 extends toward one side of the accommodating cavity from an air outlet of the centrifugal fan to a laterally outer side of the modified atmosphere film assembly 30. Each second air guiding rib plate 152 is provided between two first air guiding rib plates 151 and located between the modified atmosphere film assembly 30 and the centrifugal fan. Each third air guiding rib plate 153 is located on the laterally outer side of the modified atmosphere film assembly 30 to guide the airflow, so that the airflow may enter a gap between the modified atmosphere film assembly 30 and the bottom surface or the top surface of the accommodating cavity from two lateral sides of the modified atmosphere film assembly 30.

In some embodiments of the present invention, the modified atmosphere film assembly 30 and the centrifugal fan may be both mounted on the cover plate portion 15. A positioning convex plate 154, a positioning rib plate 155 and a buckle are extended downwardly from the cover plate portion 15 to mount the modified atmosphere film assembly 30 on the cover plate portion 15. The positioning rib plate 155, the first air guiding rib plate 151, the second air guiding rib 152 plate, and the third air guiding rib 153 plate may be all in contact with and propped against the bottom surface of the accommodating cavity. The centrifugal fan may be mounted on the cover plate portion 15 through a fan seat. The fan seat of the centrifugal fan may have its one side mounted on the buckle extended downwardly from the cover plate portion 15 and the other side mounted on the cover plate portion 15 through screws.

In some embodiments of the present invention, in order to ensure the sealing performance of the accommodating cavity, two cylindrical shrouds 156 that are provided coaxially are extended downwardly from the cover plate portion with a cross-sectional profile that is square or rectangular or oblong. The cylindrical shrouds 156 at the inner side define a circumferential boundary of the accommodating cavity. An annular rib is extended upwardly from the lower plate portion 14 and inserted into an annular groove formed by the two cylindrical shrouds 156; and a sealing ring is provided to ensure the sealing performance.

In some embodiments of the present invention, the cartridge 10 may be provided with a plurality of micro-holes, via which the drawer space may be communicated with the outside of the drawer space. The micro-holes are also called air-pressure balancing holes. Each micro-hole may be a micro-hole in a millimeter level, for example, each micro-hole may have a diameter from 0.1 mm to 3 mm. By providing the plurality of micro-holes, the pressure in the drawer space can be maintained not too low, and the nitrogen in the drawer space can be prevented from flowing outside. Even if there is some flow, it is too small or even negligible to affect the storage of the foods in the drawer space. In some optional embodiments of the present invention, the micro-holes may not be provided on the cartridge 10. Even so, a large amount of gases such as nitrogen may be present in the drawer space, and the user does not need much effort to open the drawer 20, which thereby saves a lot of effort compared to the existing vacuum storage chamber.

In some embodiments of the present invention, a locking device, a handle and a handle positioning device are provided between the drawer 20 and the cartridge 10. The locking device comprises a pivotal latch provided on each side of the drawer end cover, two snap-fit portions provided on the cartridge 10, and a snap facilitating device. Each snap-fit portion may be a projection. The snap facilitating device may be used to facilitate two pivotal latches to rotate in a direction (that is, the first direction thereof) for snapping into the respective snap-fit portions. The handle extends horizontally and is slidably mounted to the drawer end cover in a vertical direction. In addition, when the drawer 20 is in a closed state, the position of the handle may be an initial position of the handle. In addition, if the handle is configured at the initial position, two ends of the handle may be respectively in contact with and propped against the two pivotal latches to prevent each pivotal latch from rotating in the other direction opposite the first direction thereof, such that the pivotal latch may be kept in cooperation with the snap-fit portion to lock the drawer 20 to the cartridge 10. Furthermore, if the handle is moved up or down to a lock release position, that is, the handle is moved from the initial position to the lock release position, each pivotal latch may be allowed to rotate in the other direction opposite the first direction thereof, so that the pivotal latch may rotate away from the corresponding snap-fit portion when the drawer 20 is pulled outward, thereby allowing the drawer 20 to be opened. The handle positioning device is configured to keep the handle at each predetermined position when the handle is moved to the position that is mainly the initial position and the lock release position. When the drawer is opened, the user may firstly move the handle up or down to the lock release position, and the handle positioning device keeps the handle in this position to enable the user to pull the drawer 20 outward. When the drawer is closed, the user may firstly close the drawer 20 and then return the handle down or up to the initial position, and the handle positioning device keeps the handle in the position to keep the drawer 20 and the cartridge 10 in the locked state.

In order to further smooth the movement of the handle, a guiding rod and a slider are respectively provided at the two ends of the handle, and the guiding rod extends in the vertical direction. The drawer 20 further comprises two sets of sliding rails with each set provided with at least three sliding slots that extend in a vertical direction, so that the guiding rod may have a sliding slot at each of two sides, and the slider moves on the remaining sliding slot, or so that the slider may have a sliding slot at each of two sides, and the guiding rod moves on the remaining sliding slot. For example, each set of sliding rails may comprise four sliding slots, wherein the guiding rod may have a sliding slot at each of the front side and the rear side, and the slider may have a sliding slot at each of two lateral sides (that is, the left side and the right side).

Figure 5:
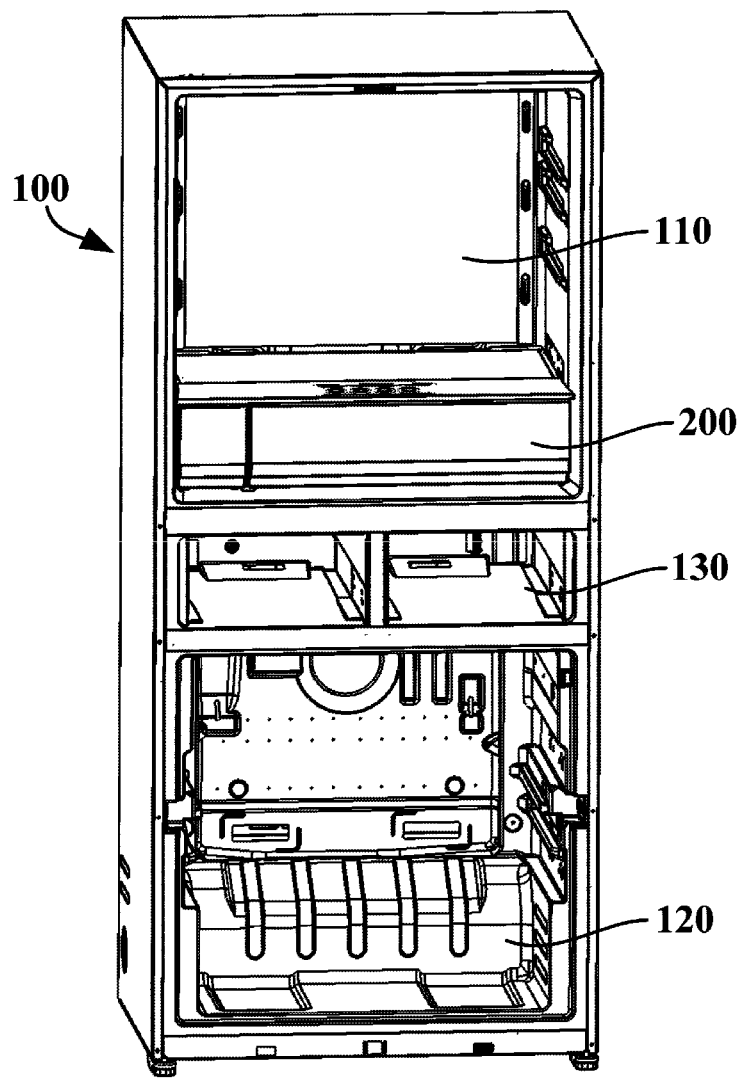
FIG. 5 is a schematic partial structural diagram of a refrigerating and freezing device according to one embodiment of the present invention.
Figure 6:
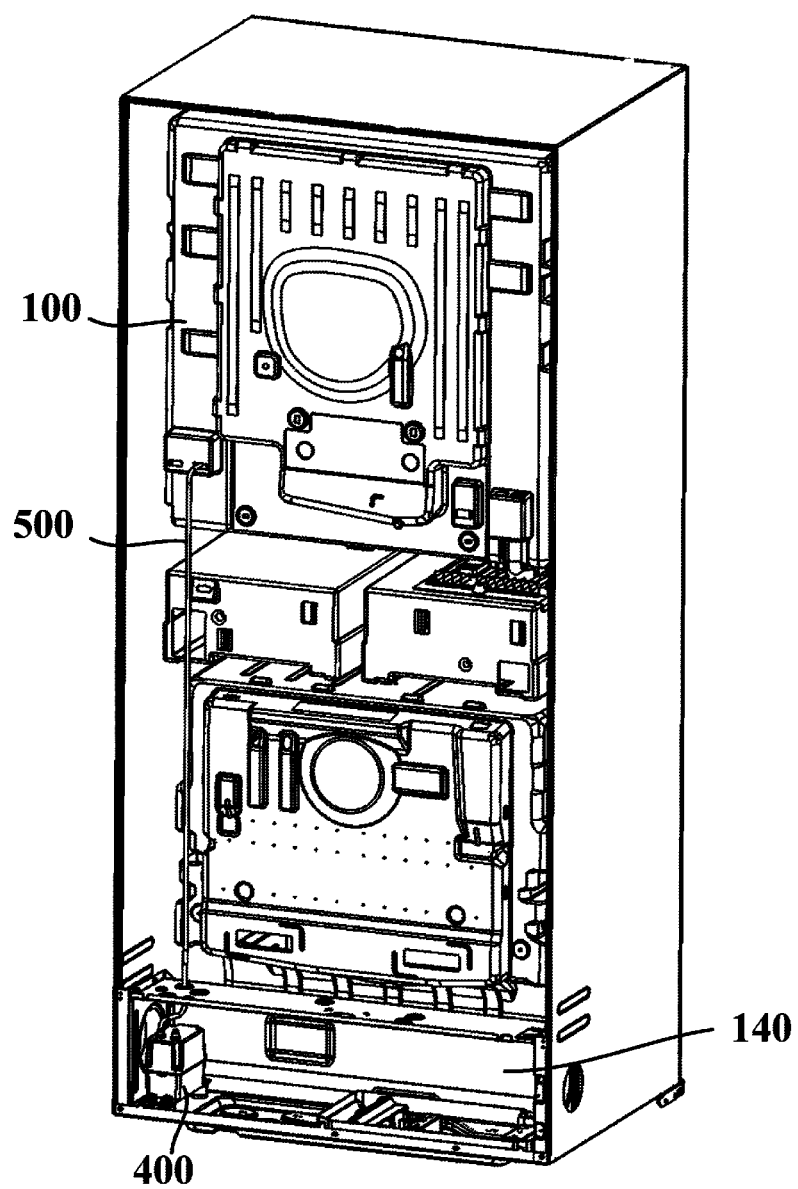
FIG. 6 is a schematic structural diagram of the structure shown in FIG. 5 from another perspective.

FIG. 5 is a schematic partial structural diagram of a refrigerating and freezing device according to one embodiment of the present invention, and FIG. 6 is a schematic structural diagram of the structure shown in FIG. 5 from another perspective. As shown in FIGS. 5 and 6, the embodiment of the present invention provides a refrigerating and freezing device that may comprise the drawer assembly 200 and the suction device 400 in any one of the above embodiments. The suction device 400 is communicated with the oxygen-rich gas collecting chamber of the modified atmosphere film assembly 30 of the drawer assembly 200 through a pipeline 500, such that the pressure of the oxygen-rich gas collecting chamber is lower than that of the accommodating cavity 11 of the drawer assembly. The suction device 400 may comprise a suction pump.

In some embodiments of the present invention, the refrigerating and freezing device may further comprise a cabinet 100, a door body, and a refrigerating system. The cabinet 100 defines a storage space 110 and a compressor compartment 140 therein. The cartridge 10 of the drawer assembly 200 is provided within the storage space 110. In particular, the cartridge 10 may be provided at the lower portion of the storage space 110. Of course, as known by a person skilled in the art, the cartridge 10 may also be provided in the middle or at the upper portion of the storage space 110. The door body may be rotatably mounted to the cabinet 100 and configured to open or close the storage space 110 defined by the cabinet 100. The refrigerating system may be a refrigerating circulation system composed of a compressor, a condenser, a throttle device, an evaporator and the like. The compressor is mounted in the compressor compartment 140. The evaporator is configured to provide cold directly or indirectly into the storage space 110. Furthermore, the storage space 110 and the drawer space are communicated with each other through a plurality of micro-holes.

In some embodiments of the present invention, the storage space 110 is a refrigerating chamber having a storage temperature generally between 2° C. and 10° C., preferably between 3° C. and 8° C. Furthermore, the cabinet 100 may further define a freezing chamber 120 that is provided below the storage space 110, and a variable-temperature chamber 130 that is provided between the freezing chamber 120 and the refrigerating chamber. The temperature within the freezing chamber 120 is generally in the range of −14° C. to −22° C. The variable-temperature chamber 130 may be adjusted according to needs to store suitable foods. The compressor compartment 140 is preferably provided behind and below the freezing chamber 120. In some alternative embodiments of the present invention, the storage space 110 may also be the freezing chamber 120 or the variable-temperature chamber 130. That is, the temperature range of the storage space 110 may be controlled from −14° C. to −22° C. or adjusted according to needs.

In some embodiments of the present invention, the suction device 400 is provided in the compressor compartment 140, and thus, the space of the compressor compartment 140 can be fully utilized without the need to additionally occupy other places. Therefore, the volume of the refrigerating and freezing device will not be increased additionally, which makes the refrigerating and freezing device have a compact structure. The suction device 400 may be provided at one end of the compressor compartment 140. The compressor may be provided at the other end of the compressor compartment 140, so that the distance between the suction device 400 and the compressor is relatively large, thereby reducing the superposition of noise and waste heat. In some other embodiments of the present invention, the suction device 400 is provided adjacent to the compressor and at one end of the compressor compartment 140 and located between the compressor and the side wall of the compressor compartment 140.

Furthermore, the suction device 400 may further comprise a mounting substrate and a sealing case. The mounting substrate may be mounted to a bottom surface of the compressor compartment 140 by a plurality of vibration-damping footpads. The sealing case is mounted on the mounting substrate. The suction pump is mounted in the sealing case. When the suction pump is in operation, the sealing case may block the noise and/or waste heat from spreading outward to a great extent. The plurality of vibration-damping footpads (may be made of rubber) may further strengthen the effect in reducing noise and vibration. The sealing case is internally provided with a mounting frame. The mounting frame is connected to the inner wall of the sealing case by a plurality of vibration-damping pads, and the suction pump is fixed inside the mounting frame to reduce the vibration and noise generated in operation of the suction pump. Particularly, two vibration-damping pads are provided at the bottom of the mounting frame, and the vibration-damping pads sleeve the positioning pillar on the bottom surface of the sealing case. A circular vibration-damping pad is provided on each of two opposite sides of the mounting frame, and is engaged in a slot of the corresponding side wall of the sealing case. A vibration-damping pad is fixed to each of the other two opposite sides of the mounting frame. The suction pump may be located among respective vibration-damping pads within the sealing case and fixed to the mounting frame by screws.

The detailed descriptions set forth above are merely illustrative of the possible embodiments of the present invention, and are not intended to limit the protection scope of the present invention. Equivalent embodiments or modifications that do not depart from the spirit of the invention are intended to be included in the protection scope of the present invention.

What is claimed is:

1. A drawer assembly for a refrigerating and freezing device, comprising:
   a cartridge, having a drawer space defined therein and an accommodating cavity defined in a top wall thereof, the accommodating cavity being communicated with the drawer space;
   a drawer, slidably mounted in the cartridge to be operatively withdrawn from and inserted into the cartridge from a forward opening of the cartridge; and a modified atmosphere film assembly, mounted in the accommodating cavity and having at least one modified atmosphere film and an oxygen-rich gas collecting chamber, wherein each modified atmosphere film has one side facing the oxygen-rich gas collecting chamber and another side facing the accommodating cavity, such that when the pressure of the oxygen-rich gas collecting chamber is lower than that of the accommodating cavity, oxygen in the air of the accommodating cavity is transmitted into the oxygen-rich gas collecting chamber through the at least one modified atmosphere film, thereby discharging a part of or all of the oxygen from the air of the drawer space to obtain in the drawer space a gas atmosphere that is rich in nitrogen but poor in oxygen to facilitate freshness-keeping of the foods;

wherein at least one first communication hole and at least one second communication hole are defined in an inner side surface of the top wall of the cartridge; the drawer space is communicated with the accommodating cavity through the at least one first communication hole and the at least one second communication hole; and the drawer assembly further comprises a fan configured to drive gas in the drawer space to the accommodating cavity through the at least one first communication hole, and drive gas in the accommodating cavity to the drawer space through the at least one second communication hole.

2. The drawer assembly according to claim 1, wherein the fan is a centrifugal fan that is provided in the accommodating cavity and located above the at least one first communication hole.

3. The drawer assembly according to claim 2, wherein the top wall comprises a lower plate portion and a cover plate portion, an upper surface of the lower plate portion forms a recessed groove, and the cover plate portion is provided to cover the recessed groove to form the accommodating cavity.

4. The drawer assembly according to claim 3, wherein:
two sets of air guiding rib plates, which are symmetrically provided, are extended downwardly from an inner surface of the cover plate portion, each set of the air guiding ribs comprising:
   a first air guiding rib plate, extending toward one side of the accommodating cavity from an air outlet of the centrifugal fan to a laterally outer side of the modified atmosphere film assembly;
   at least one second air guiding rib plate, provided at an inner side of the first air guiding rib plate and located between the modified atmosphere film assembly and the centrifugal fan; and
   at least one third air guiding rib plate, provided at the laterally outer side of the modified atmosphere film assembly.

5. The drawer assembly according to claim 1, wherein the modified atmosphere film assembly is provided above the at least one second communication hole.

6. The drawer assembly according to claim 1, wherein the at least one first communication hole is provided at a front portion of the top wall, and the at least one second communication hole is provided at a rear portion of the top wall.

7. The drawer assembly according to claim 1, wherein the modified atmosphere film assembly further comprises a support frame; the support frame has a first surface and a second surface that are provided oppositely, and forms therein at least one airflow passage communicated with the first surface and the second surface; and the number of the modified atmosphere films is two, the two modified atmosphere films being respectively provided on the first surface and the second surface of the support frame, so as to form the oxygen-rich gas collecting chamber together with the at least one airflow passage of the support frame.

8. A refrigerating and freezing device, comprising the drawer assembly of claim 1 and a suction pump, wherein the suction device is communicated with the oxygen-rich gas collecting chamber of the modified atmosphere film assembly of the drawer assembly through a pipeline, such that pressure of the oxygen-rich gas collecting chamber is lower than that of the accommodating cavity of the drawer assembly.

9. The refrigerating and freezing device according to claim 8, further comprising:
   a cabinet, defining therein a storage space in which the cartridge of the drawer assembly is provided; and
   a door body, configured to open or close the storage space.

* * * * *